G. W. DAY.
CHECK VALVE.
APPLICATION FILED OCT. 13, 1913.
1,120,696.
Patented Dec. 15, 1914.
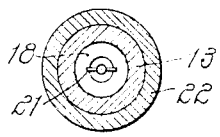
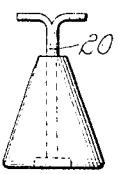
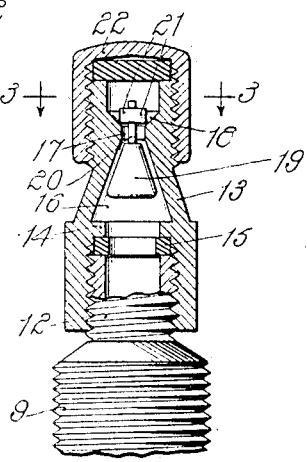
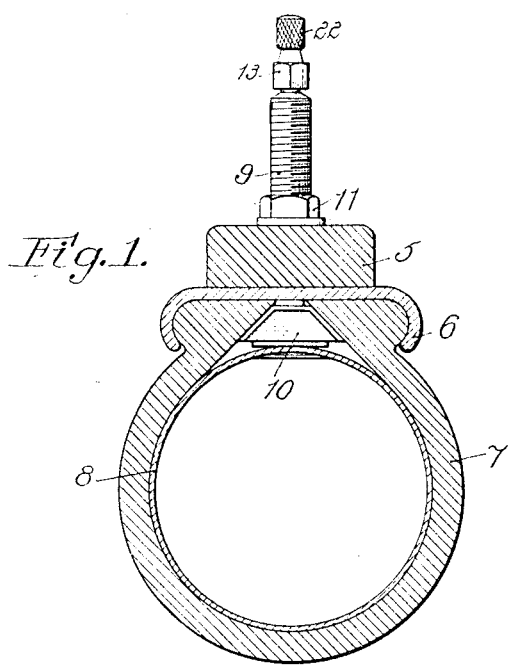
Witnesses:
Robert F. Bracke
Leonard E. Bogue
Inventor
George W. Day
By Brown Williams Bell Hanson & Bottcher
Attorneys

UNITED STATES PATENT OFFICE.

GEORGE W. DAY, OF CHICAGO, ILLINOIS.

CHECK-VALVE.

1,120,696.

Specification of Letters Patent. Patented Dec. 15, 1914.

Application filed October 13, 1913. Serial No. 794,810.

*To all whom it may concern:*

Be it known that I, GEORGE W. DAY, a citizen of the United States, residing at Chicago, in the county of Cook and State of Illinois, have invented certain new and useful Improvements in Check-Valves, of which the following is a full, clear, concise, and exact description, reference being had to the accompanying drawings, forming a part of this specification.

My invention relates to check valves and, while it may be employed in any fluid system where a check valve is desired, I contemplate its use particularly in connection with pneumatic tires such as are employed in automobiles and bicycles.

The invention lies in certain features of the structure, the objects of which are to simplify the construction, use and repair of the device and to provide a unit which essentially comprises the necessary valve elements. By the provision of such a structure I eliminate the inconveniences encountered in devices of the prior art when access to the interior parts is to be had and the liability of losing small detachable parts under these circumstances.

In order to instruct those skilled in the art in the use of my invention, I have illustrated and shall describe a specific form of my device and shall refer to its application to a pneumatic tire.

In the accompanying drawings—Figure 1 is a cross-sectional view of a pneumatic tire arrangement, showing my valve applied thereto; Fig. 2 is an enlarged axial sectional view of the structure of my invention; Fig. 3 is a cross-sectional view taken on the plane of the line 3—3 of Fig. 2 and looking in the direction indicated by the arrows, and Fig. 4 is an elevational view of a modified form of valve member.

Referring first to Fig. 1, the wooden inner felly is illustrated at 5, upon which is placed the metallic rim 6 and the outer casing of the pneumatic tire is illustrated at 7. The inner tube is illustrated at 8, and this inner tube is provided with a threaded valve stem 9 with which a supporting base 10 is associated and which a nut 11 engages to clamp the stem tightly in place relative to the rim and felly and the tire. The upper portion of the standard stem 9 is reduced, as illustrated at 12, and this reduced end portion is screw-threaded, as illustrated in Fig. 2. This stem has the usual central bore through which air may be pumped into the tire.

The valve casing is in the form of an integral unit 13 provided with a central passageway the parts of which are variously formed to accommodate the associated members. The lower end of the unit 13 is tapped for the reception of the screw-threaded reduced end 12 of the valve stem 9, and approximately midway between the upper and lower ends of the valve casing a shoulder 14 is provided, a compressible washer 15 of fiber or rubber being disposed against the shoulder and being firmly engaged by the end 12 of the valve stem to form a tight joint. The lower portion of the unit 13 is polygonal, as illustrated, for the reception of a wrench, and above this polygonal portion the casing 13 has a conical tendency, as illustrated clearly in Fig. 2. Within the conical portion of the unit 13 is a correspondingly-shaped chamber 16, this chamber terminating at its upper end in a reduced portion 17 of the bore, which then enlarges upwardly by a conical portion 18 into a pocket at the top of the unit.

The valve 19 is in the form of a conical member, conveniently constructed of fiber. An upwardly-extending pin 20 is lodged in the valve member 19 and, as illustrated, passes upwardly through the passageway 17 and into the pocket above. Within the pocket the valve pin 20 is provided with diametrically opposite extensions 21, 21, which are conveniently formed by pinching the wire of which the pin is constructed. It will be seen that the enlargements 21, 21 on the pin may rest upon the conical base walls of the pocket and that when they are in this position the valve member 19 is hung therefrom and is held at such a height as to leave a considerable distance between it and the passageway 17. It will be seen, however, that pressure within the tire forces the valve 19 against the upper part of the conical chamber, the walls of which this form a valve seat, and closes the passageway 17. When air is being forced into the tire the valve member 19 is moved into the position illustrated in Fig. 2, and it is suspended in that position by means of the extensions 21, 21, as hereinbefore described. Under these circumstances, the air may pass around the extensions and the pin, as is clear from Fig. 3, and around the valve member 19, and may pass downwardly through the valve stem and into the tire. Under these circumstances, the valve member is held against any tendency to close the passageway and act as a check against the air passing in that direction.

In Fig. 4 I have illustrated a modified form of valve in which the pin 20, instead of being pinched to form the lateral extensions thereon, is split, as illustrated, the resulting halves being turned in opposite directions so as to form members for engaging the conical base walls of the pocket.

It will be seen that the valve member with its pin, before being pinched or split, may be passed into the valve chamber from below and that the pin, passing into the pocket, may be engaged by a tool to provide the lateral extensions. Once these extensions are provided, the valve is confined within the limits of its necessary movement and the operation proceeds as set forth. The conical portion of the unit terminates at its upper end in a part of uniform diameter which is screw-threaded for the reception of a removable cap 22, provided to keep dust from entering the valve chamber.

I claim as new and desire to secure by Letters Patent:

1. In a device of the class described, the combination of a valve stem having an externally threaded end, an integral casing having an internally screw-threaded bore at the lower end adapted to engage the threaded end of the valve stem, an upper chamber, a substantially frusto-conical valve chamber below said upper chamber, an opening of comparatively small cross-section affording communication between the upper chamber and the smaller end of said frusto-conical valve chamber, an inwardly extending annular flange integral with the balance of the casing, providing a restricted opening between the frusto-conical valve chamber and said screw-threaded bore, an annular gasket between said flange and the end of said valve stem, a frusto-conical valve member in said frusto-conical valve chamber, a valve rod fixed to the smaller end of said valve member projecting through the opening connecting the frusto-conical valve chamber with said upper chamber and provided with means to suspend said valve member between its seat against the wall of said frusto-conical valve chamber and said annular flange, the opening between the frusto-conical valve chamber and the screw threaded bore being of substantially the same diameter as the larger end of said frusto-conical valve member, the diameter of the larger end of said frusto-conical valve chamber being materially greater than the diameter of the last mentioned opening, and the wall of said frusto-conical valve chamber immediately above said annular flange being extended upwardly to form a seat for said frusto-conical valve member.

2. In a device of the class described, the combination of an integral valve casing having an externally screw-threaded bore at its lower end adapted to engage the externally screw-threaded end of a valve stem, an inwardly extending annular flange integral with the balance of said casing above the said screw-threaded bore, a frusto-conical valve chamber above said annular flange, the diameter of the larger end of said frusto-conical valve chamber being materially greater than the diameter of the opening between said screw-threaded bore and said frusto-conical valve chamber, the wall of said frusto-conical valve chamber being continued upwardly to form a seat for the frusto-conical valve member, an upper chamber, and an opening of comparatively small cross-section between the smaller end of said frusto-conical valve chamber and said upper chamber, a frusto-conical valve member in said frusto-conical chamber, the diameter of the larger end of said valve member being substantially the same as that of the opening between said screw-threaded bore and said frusto-conical valve chamber and a valve rod attached to the smaller end of said frusto-conical valve member and extending upwardly through the opening between said frusto-conical valve chamber and said upper chamber, and provided with means adapted to suspend said valve member between its seat at the upper end of said frusto-conical valve chamber and said annular flange.

In witness whereof, I hereunto subscribe my name this 11th day of October, A. D. 1913.

GEORGE W. DAY.

Witnesses:
A. G. McCaleb,
Leonard E. Bogue.